March 17, 1970   R. SCHABERT ET AL   3,501,368
INTERLINING
Filed July 12, 1968
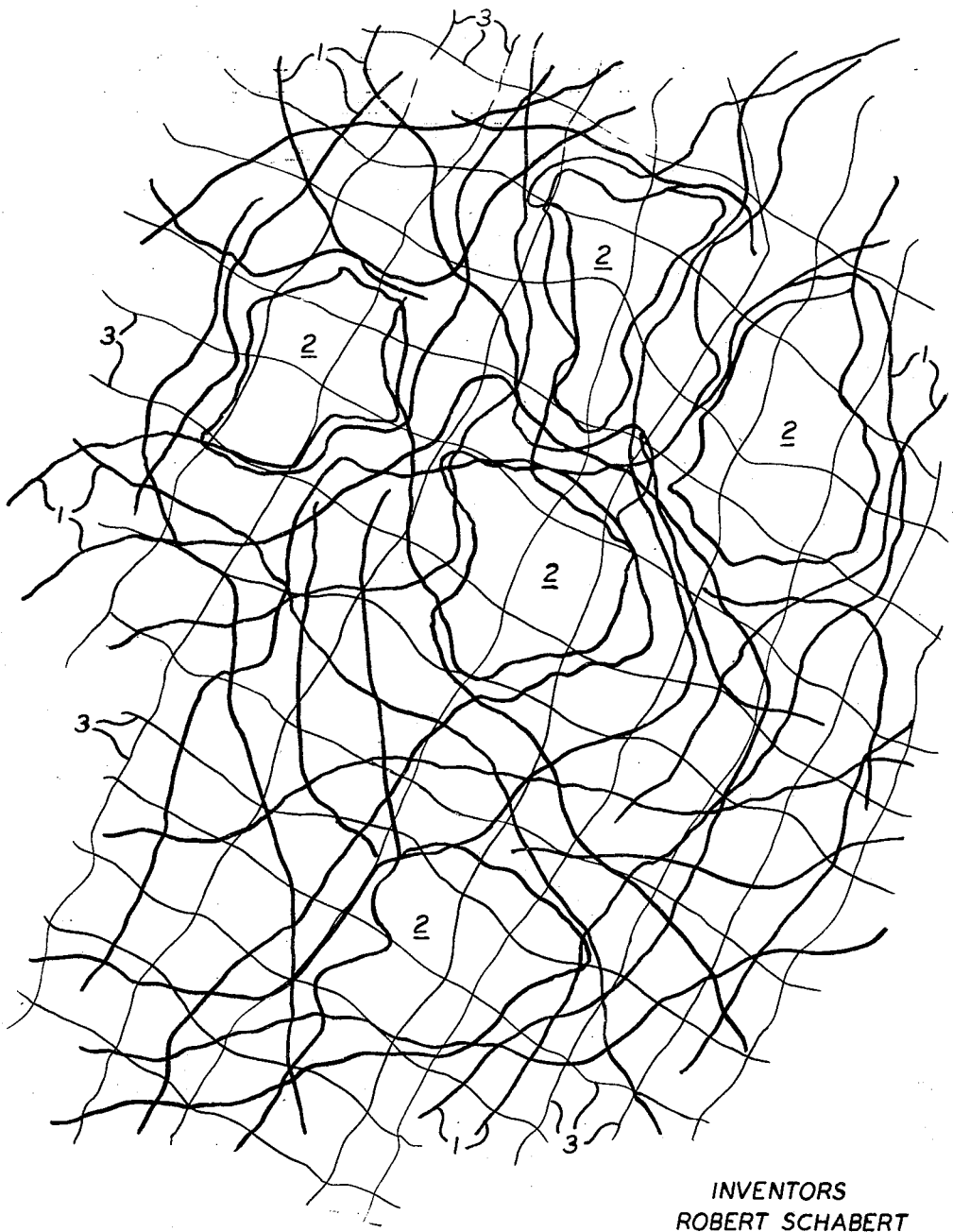
INVENTORS
ROBERT SCHABERT
WILHELM BÜCHSENSTEIN
BY
Burger, Dinklage + Sprung
ATTORNEYS.

United States Patent Office 3,501,368
Patented Mar. 17, 1970

3,501,368
INTERLINING
Robert Schabert, Weinheim an der Bergstrasse, and Wilhelm Büchsenstein, Schriesheim, Bergstrasse, Germany, assignors to Carl Freudenberg Kommanditgesellschaft auf Aktien, Weinheim an der Bergstrasse, Germany, a corporation of Germany
Continuation-in-part of application Ser. No. 387,912, Aug. 6, 1964. This application July 12, 1968, Ser. No. 747,422
Claims priority, application Germany, Aug. 6, 1963, F 40,424
Int. Cl. B32b 3/10, 7/14; D04h 1/04
U.S. Cl. 161—112                                   10 Claims

ABSTRACT OF THE DISCLOSURE

Iron-on fabric composed of thermoplastic fleece material having a resin in the form of a cobweb deposited on one side thereof. The resin contains a plasticizer for the sheet material, and upon heating the material for ironing-on, plasticizer passes to the sheet material, softening it, and the softened sheet material is then adhesive on both sides thereof.

---

This application is a continuation-in-part of Ser. No. 387,912, filed Aug. 6, 1964 and now abandoned.

The invention relates to an iron-on stiffening material.

It is known to provide garments with interlining materials to give them body and preserve their shape. Whereas horsehair was formerly preferred as the interlining, nowadays a fleece material is often used, which has a coating of adhesive on its surface. This interlining can simply be joined to the material with a hot iron, as is apparent, for example, from German "Auslegeschrift" 1,146,028.

It is possible, of course, to provide the fleece material with adhesive on both sides and then insert it between two layers of cloth which can then be pressed together with a hot iron. In the latter case, the fleece material can act only as a support for the adhesive. It will therefore be kept as thin as possible, since otherwise it serves no further purpose.

It has been proposed to apply a plasticized polyamide, which is to serve as the adhesive, to a siliconized paper and to lay this paper over the material to be stiffened. If the hot iron is passed over the paper, the adhesive coating is transferred to the material. The paper can then be pulled off. Then the second piece of cloth is laid upon the first piece, which now bears an adhesive coating, and it is ironed a second time. This process is naturally time-consuming. It is also very expensive, since the siliconized paper is more expensive than the adhesive, and cannot be used after it is pulled off. The present invention avoids these disadvantages.

According to the invention, an interlining is provided between pieces of fabric by combining a sheet material, e.g., a fleece of non-woven fibers, and resin to provide the resulting combination initially with the resin disposed on one side of the sheet. The fleece is preferably thermoplastic. The resin is in the form of a cobweb and contains a plasticizer for the sheet material. The resin is preferably thermoplastic. While the resin can be applied to both sides of the fleece, a feature of the invention is that it need be applied to only one side of the fleece. The resin in the initial condition is stable, but forms with the sheet on application of heat a composite characterized in being adhesive on both sides thereof. The sheet material bearing the resin, in said initial condition, is interposed between the pieces of fabric to be provided with an interlining. Heat is then applied to provide the sheet material in the form of a composite, as mentioned, so that it is adhesive on both sides thereof. Pressing of the pieces of fabric together occasions a bonding effected by the composite.

The sheet material can be a so-called perforated fleece, such as one manufactured, for example, according to Canadian Patent 645,085 or U.S. Patent 3,133,349. A cobweb-like mesh of plasticized polyamide filaments can be applied to this perforated fleece and since the strands of filament often span the holes in the fleece, this stiffening material has cobweb filament exposed from each side of the sheet. The perforated fleece in this embodiment can serve as a supporting material. In this embodiment the perforated fleece can be formed of any suitable material, as it may perform merely a physical function. The weight can be about 10–150 grams per square meter.

The cobweb is preferably polyamide but can be other material as will serve for the softening and migration to provide the desired adhesive upon application of heat. The cobweb can be any network fiber formation. Use of the resin in the form of a cobweb provides high surface contact for transfer of the plasticizer to the fleece.

It is also possible to provide a cobweb-like coating of plasticized polyamide on a fleece material made of thermoplastic fibers such as can be made, for example, according to German Auslegeschrift 1,099,845, Example 1, lines 14 to 24. In this embodiment, the adhesive coating is at first on only one side of the fleece, and it works as a two-sided adhesive upon ironing, since the plasticizer diffuses from the polyamides during the ironing into the thermoplastic fibers of the fleece material and reduces their softening point in such a manner that these fibers, too, have an adhesive effect.

The fleece is preferably thermoplastic, and can have a weight of about 10–150 grams per square meter, and can be any material for which the cobweb includes a plasticizer. Preferably, the fleece is a thermally bonded fleece of thermoplastic fibers. It can, however, be bonded with a thermoplastic bonding agent, e.g., a polyamide or polyacrylate. The cobweb is preferably polyamide but can be any material working in like manner with the fleece. In this embodiment, the heat employed is sufficient to cause transfer of the plasticizer but not so great as to cause melting and film formation of the fleece. The interlining is preferably such that it can be applied at 100–130° C., preferably 120–130° C.

An ordinary rayon or viscose staple fiber fleece can have on one side a cobweb of plasticized polyamide. Upon heating, as by during ironing, the highly absorbent fibers will absorb the plasticizer so that the adhesive effect will be provided on both sides of the sheet. Here the fleece can be any suitably absorbent material with respect to the deposited cobweb when the latter is at the ironing temperature. The cobweb is preferably polyamide but can be other material functioning in like manner.

The amount of cobweb or granules deposited on the perforated or plain fleece can be about 5–100 grams per square meter, preferably 20–40 grams per square meter.

The following examples represent embodiments of the invention:

Example 1

A fiber mixture consisting of 70 parts cotton, 22 deniers, and 30 parts polyamide fibers, 3 deniers, is teased and formed by means of a steam jet into a fleece with a weight of 25 grams per square meter. To this end, a pipe provided with holes is used, from which the steam is emitted pulsatingly at a temperature of 150° C. By this steam treatment, the polyamide fiber is put into a sticky state, whereby a bonding of the fleece material takes place. At the same time, the contact of the steam on the fleece forms holes in the fleece material, which have a diameter of approximately 9–12 mm. (see also Canadian Patent 645,085, U.S. Patent 3,133,349 to Nottebohm, and U.S. Patent 3,113,349 to Nottebohm et al.). This fleece product thus bonded is sprayed with a solution consisting of 32 parts soluble polyamide, e.g., Ultramid Ic of Badische Anilin & Soda-Fabrik, Ludwigsham, Germany
30 parts benzenesulfonic acid monomethyl amide
90 parts methyl alcohol
25 parts trichloroethylene
13 parts water using a De Vilbis spray gun, AC nozzle 2.8 mm. diameter, air cap 26. The distance from the fleece material amounted to about 50 to 80 cm.; spray temperature 40° C. In this manner, the fleece, including the holes, is coated with polyamide filaments in the manner of a cobweb in an amount of 30 grams/m.$^2$.

The perforated fleece after the steam treatment weighing 55 grams/m.$^2$ cools and loses its stickiness. Following spraying and evaporating of volatiles, the cobweb is left in dry form on the fabric. Heat, as from ironing, is utilized to effect the bonding to, for example, top materials.

Example 2

A thermally bonded 25-gram fleece made of 3-denier fibers of a copolymer of 60% vinyl chloride and 40% acrylonitrile, with a weight of 25 grams per square meter, is sprayed with the solution described in Example 1. The substance used as the plasticizer for the polyamide is also a plasticizer for the fibers, so that, when top material is ironed together with top material or other textile material with the coated fabric interposed, the fibers used are also softened by the plasticizer, whereby a two-sided adhesion is made possible in spite of the density of the fleece.

Example 3

A viscose rayon fiber fleece with a weight of 10 grams per square meter is impregnated with a 1% polyvinyl alcohol solution, wrung to a moisture content of 350%, and then dried. The fleece material thus obtained is sprayed in the manner described in Example 1. In this manner, considerable amounts of the cobweb-like, sprayed-on material is taken up by one side of the fleece and upon heating during ironing the adhesive is absorbed so that both sides become tacky.

In the drawings:

The figure represents an iron-on material wherein a perforated fleece is used.

Referring to the figure, the sheet material is a non-woven fabric formed of filaments 1 and having perforations 2 of size about 5–10 mm. in diameter. A cobweb fleece formed of filaments 3 is disposed over the non-woven fleece formed of filaments 1, and the filaments 3 bridge the openings 2 of the non-woven fleece.

The fleece instead of being perforated can be a "continuous fleece," i.e., a fleece not having perforations as does the fleece of the figure, but rather a conventional fleece, which of course has small openings and can breathe.

Unless otherwise indicated, percentages herein are by weight.

While the invention has been described with respect to particular embodiments thereof, it will be appreciated that these embodiments are merely representative and do not serve to set forth the limits of the invention.

What is claimed is:

1. Iron-on interlining material comprising a fleece and a resin in the form of a cobweb and deposited on one side of the fleece, said resin containing a plasticizer for the fleece, the resin at ambient conditions being stable with respect to said fleece, the plasticizer upon heating the material for ironing-on, passing to the fleece and softening the fleece, the softened fleece being adhesive on both sides thereof.

2. Iron-on interlining according to claim 1, the fleece being formed of thermoplastic filaments.

3. Iron-on interlining according to claim 1, said fleece being perforated.

4. Iron-on interlining according to claim 1, said resin being deposited on only one side of the fleece.

5. Iron-on interlining according to claim 1, said fleece comprising a copolymer of vinyl chloride and acrylonitrile, the resin being polyamide.

6. Iron-on interlining according to claim 1, said fleece comprising vinyl chloride fibers and vinyl acetate fibers, the resin comprising a mixture polyvinyl acetate and dicyclohexyl phthalate plasticizer.

7. Iron-on interlining according to claim 1, said fleece being a continuous fleece.

8. Iron-on interlining according to claim 1, said resin comprising a polyamide.

9. Process of providing an interlining between pieces of fabric which comprises interposing an iron-on interlining accordng to claim 1, between the pieces of fabric, applying heat to render said interlining adhesive on both sides thereof as aforesaid; and pressing both pieces of fabric into contact with said interlining to cause the pieces of fabric to adhere thereto.

10. Process of providing an interlining between pieces of fabric which comprises interposing an iron-on interlining according to claim 4, between the pieces of fabric, applying heat to render said interlining adhesive on both sides thereof as aforesaid; and pressing both pieces of fabric into contact with said interlining to cause the pieces of fabric to adhere thereto.

References Cited

UNITED STATES PATENTS

| 2,240,326 | 4/1941 | Burns | 161—114 |
| 2,456,344 | 12/1948 | Voala | 260—31.8 |
| 2,676,324 | 4/1954 | Johnson | 2—143 |
| 2,715,591 | 8/1955 | Graham et al. | 161—170 XR |
| 2,992,149 | 7/1961 | Drelich | 161—148 XR |
| 3,223,575 | 12/1965 | Griswold | 161—146 XR |

FOREIGN PATENTS 556,813  10/1943  Great Britain.

ROBERT F. BURNETT, Primary Examiner

ROGER L. MAY, Assistant Examiner

U.S. Cl. X.R.

28—73; 156—309, 313; 161—113, 148, 150, 157, 167